Figure 1:
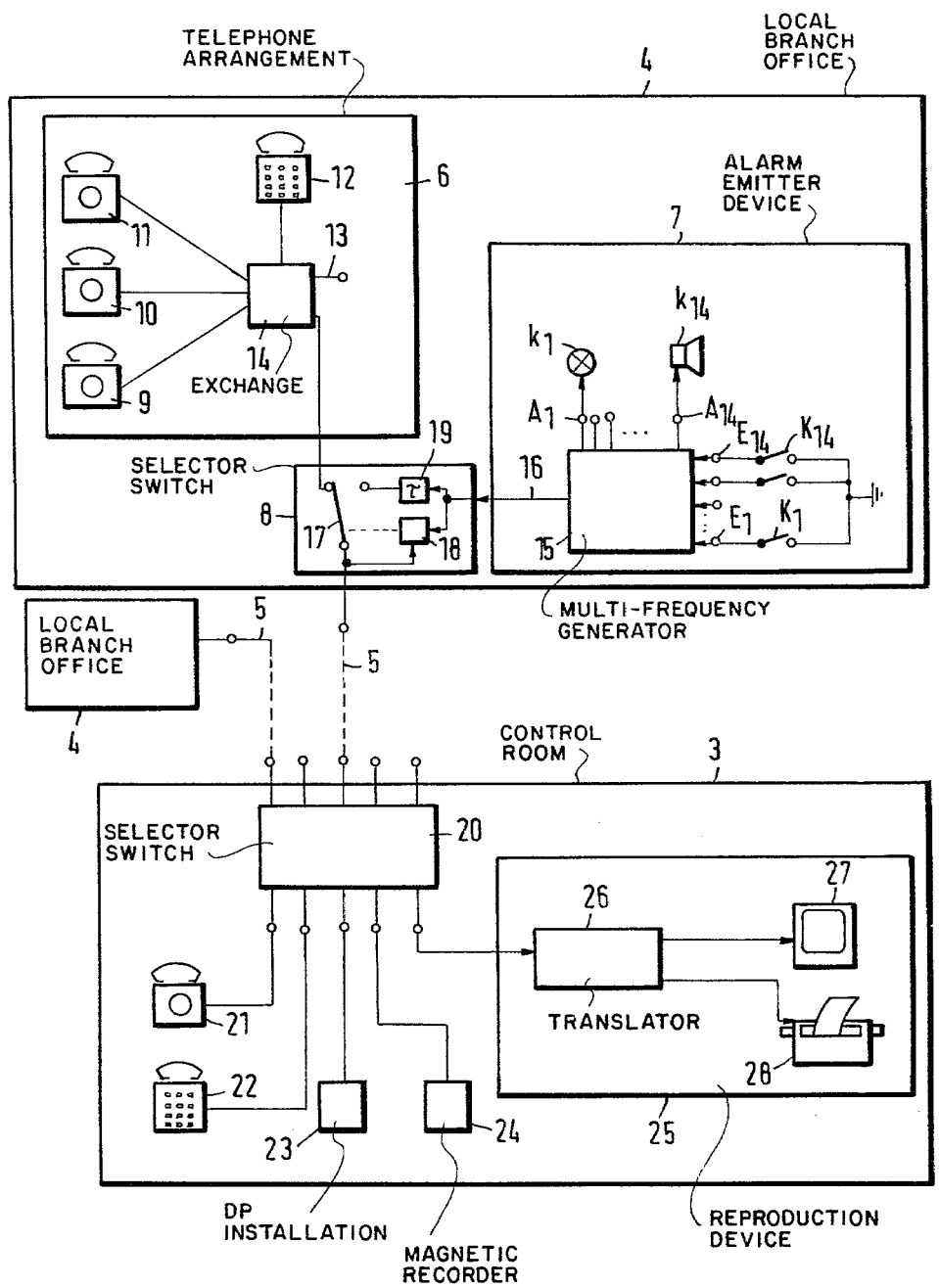

United States Patent [19]

Kutzki

[11] 4,249,036
[45] Feb. 3, 1981

[54] REMOTE ALARM INSTALLATION

[75] Inventor: Manfred Kutzki, Berlin, Fed. Rep. of Germany

[73] Assignee: Berliner Bank AG, Berlin, Fed. Rep. of Germany

[21] Appl. No.: 19,497

[22] Filed: Mar. 12, 1979

[30] Foreign Application Priority Data

Mar. 13, 1978 [DE] Fed. Rep. of Germany ....... 2810875

[51] Int. Cl.$^3$ .......................................... H04M 11/04
[52] U.S. Cl. ..................................... 179/5 R; 340/502
[58] Field of Search ...................... 179/2 A, 5 R, 5 P; 340/500, 502, 504, 505, 516

[56] References Cited

U.S. PATENT DOCUMENTS

| 3,233,232 | 2/1966 | Brennon | 179/5 R |
| 3,582,555 | 6/1971 | Kok | 179/5 R |
| 3,594,508 | 7/1971 | Glidden | 179/5 R |

*Primary Examiner*—Bernard Konick
*Assistant Examiner*—Joseph A. Popek
*Attorney, Agent, or Firm*—Wayne B. Easton

[57] ABSTRACT

In a remote alarm installation an alarm signal emitter device and a local selector switch are associated with local telephone junction points which are connected via respective telephone lines to a control room. The selector switch normally connects the local telephone junction point to its telephone line. When an alarm signal emitter device generates an alarm signal, this controls the selector switch in such a way that it connects, instead of the local telephone junction point, the output from the alarm signal emitter device to the telephone line so that the alarm signal is transmitted into the control room. Each alarm signal indicates the kind and place of the alarm and the information is reproduced in the control room. Each alarm signal emitter device contains a number of alarm signal emitters. All of the alarm signals are transmitted in the form of a combination of different frequencies from a generator, the frequency combinations being different from one another.

6 Claims, 3 Drawing Figures

REMOTE ALARM INSTALLATION

This invention relates to a remote alarm installation.

Remote alarm installations are known which have a local alarm signal emitter device the alarm signal from which can be fed via a telephone line to a reproduction device in a control room. At the local end of the telephone line there is a local selector switch by which that end of the line can be switched over, in dependence upon the occurrence of the alarm signal, from a local telephone junction point on to the output from the local alarm signal emitter device. At the control room end of the line there is a control room selector switch which switches the control room end of the line on to the control room reproduction device in dependence upon the transmitted alarm signal.

In the case of a known alarm installation of this kind (see German Patent Specification No. 1,060,448) each local alarm signal emitter device has a supervisory contact, upon release of which a relay switches over the telephone line, if necessary cutting off a conversation which is at that moment in progress, from the local telephone junction point on to an alarm signal emitter which includes a magnetic recorder. The alarm signal emitter also sends out an emergency call and selector pulses for making a connection to a control room and for triggering an alarm in the control room. This remote alarm installation is suitable only for the transmission of one single predetermined alarm signal. Furthermore, a magnetic recorder is a relatively cumbersome and costly device.

Another remote alarm installation is known (see German O/S No. 1,537,912) in which a local alarm signal emitter device can be connected via a special transmission line to a control room. The alarm signal emitter device includes a tape recorder in which a magnetic tape circulates continuously. On the magnetic tape, alarm signals and stepping signals are recorded one after another. Recording stations are scanned in sequence by means of the stepping signals. If the recording station being scanned at any time is in operation because of an alarm situation, the output from the tape recorder is connected to the transmission line and the succeeding alarm signal, which is recorded on the tape and is associated with the recording station which is just being scanned, is transmitted to the control room. This alarm installation is likewise relatively costly because of the special transmission line and the employment of the tape recorder. The tape recorder must be continuously in operation and therefore undergoes heavy wear.

In another known remote alarm installation (see German A/S No. 2,129,161) having a local alarm signal emitter device, the alarm signal can be fed via a telephone line to a reproduction device in a control room. The alarm signal emitter device includes a turntable having a number of circular tracks having electrically conductive and non-conductive sections lying separately in the circumferential direction, which are scanned by sliding contacts associated with the individual circular tracks. Individual conductive sections are acted upon by d.c. and a high-frequency signal in dependence upon the position of angular rotation of the turntable, so that, in the scanning, blocks of high-frequency pulses and blocks of low-frequency selector pulses alternate with one another. The blocks of high-frequency pulses form an alarm signal. Here, too, only one recording station is associated with each telephone line, whilst the turntable and the sliding contacts undergo heavy wear.

It is also known (see German A/S No. 2,222,707) to transmit commands, information, signals and/or measured values by combinations of different frequencies.

An object of the present invention is to provide a remote alarm installation of the kind mentioned initially which relatively cheaply enables a plurality of recording stations to be supervised and alarm signals associated with each recording station to be transmitted over a single telephone line.

In accordance with the invention, in an alarm installation of that kind the local alarm signal emitter device includes a multi-frequency generator having a number of frequency selection inputs each of which is acted upon by a respective alarm signal emitter; each multi-frequency alarm signal generated by the multi-frequency generator includes a generator identification and an alarm signal emitter identification; the control room selector switch connects the control room end of the line to the reproduction device upon receipt of a generator identification; and the reproduction device includes a translator for translation of the alarm signal into an associated optical and/or acoustic reproduction signal.

At least as many alarm signal emitters may be provided in the local alarm signal emitter device as the different frequencies which can be transmitted over the telephone line. If a different combination of differing frequencies is associated with each alarm signal emitter, the possible number in a given band width of the telephone line can be still further increased. Even in the case of simultaneous generation of a number of alarm signals these can be differentiated in the control room. The multi-frequency generator can be constructed in a simple way to be static (i.e. without moving parts). In particular, a commercial multi-frequency generator may be employed such as is used in telephone devices which work according to the multi-frequency selection method in which, in each case, at least two different frequencies are associated with the ten digits from which the calling numbers are formed. These multi-frequency generators enable the formation of up to sixteen different characters (digits, letters or other symbols) and are constructed using semiconductor techniques, frequently as integrated circuits. Their application in this alarm installation has the advantage that in the control room which usually has exchange equipment as the selector switch no additional outlay has to be expended for the decoding of the generator identification and reversal of the selector switch in dependence upon the generator identification.

If the required number of alarm signal emitters in the alarm signal emitter apparatus exceeds the capacity of one multi-frequency generator, the local alarm signal emitter device may have at least one further multi-frequency generator. Each local alarm signal emitter may be connected to a respective one of the frequency selection inputs of all of the multi-frequency generators, in which case, however, all of the local alarm signal emitters are connected separately to a different combination of frequency selection inputs. The local end of the line may be connectable via the local selector switch to all of the multi-frequency generators one after another. In this way the number of available alarm signal emitters in the local alarm signal emitter device is raised to $y^x$, where y is the number of frequency selection inputs to one multi-frequency generator and x is the number of multi-frequency generators.

In this case, the local selector switch may comprise a number of two-pole changeover switches, corresponding with the number of multi-frequency generators, connected in series, of which the switch section not connected in series with one of the other changeover switches is connected, in each case, to one of the multi-frequency generator outputs. This enables the use of a plurality of like components for the selector switch, corresponding to the number of generators.

Then, after receipt of an alarm signal, the local selector switch can be switched back to the local junction point in dependence upon an acknowledgement signal sent back from the control room. In this way it is ensured that the telephone line is not interrupted longer than is necessary for the transmission of an alarm signal. The acknowledgement signal can simultaneously bring about the stepping on of the telephone line connection to further multi-frequency generator, and the necessary resettings. In this case the alarm signal from the local alarm signal emitter may be repeated if there is no acknowledgement signal. In this way it is achieved that in the event of an interruption of the connection to the control room because of a disturbance which occurs only briefly, a subsequently repeated alarm signal transmission reaches the correct place so that the connection is automatically restored.

It may then be ensured that, after the cutting off of the local junction point, the local selector switch connects the local end of the line on to the local alarm signal emitter device with a time delay. In the case of an open local end of the line, the control room selector switch cuts off a junction point connected to the control room end of the line via the control room selector switch, in which case it is not a question of the reproduction device. In this way it is ensured that in the case of a telephone selection system, such as is usual for multi-frequency key selection telephone systems, the line interruption brought about locally by the alarm signal during a telephone conversation is recognised in the control room as the replacement of the local telephone handset, and also in the control room the telephone equipment of the other telephone subscriber is cut off automatically from the control room end of the line so that no telephone conversation signals disturb the decoding of an alarm signal in the control room reproduction device.

If an alarm is to be given not only in the control room but also locally when an alarm signal emitter responds, the response of a local alarm signal emitter can be reproducible locally optically and/or acoustically.

Acknowledgment signal operations and techhiques as contemplated herein are not proffered as being novel per se but are within the bounds of the state of the art on this subject as evidenced by U.S. Pat. Nos. 3,233,232 and 3,594,508.

Figure 2:
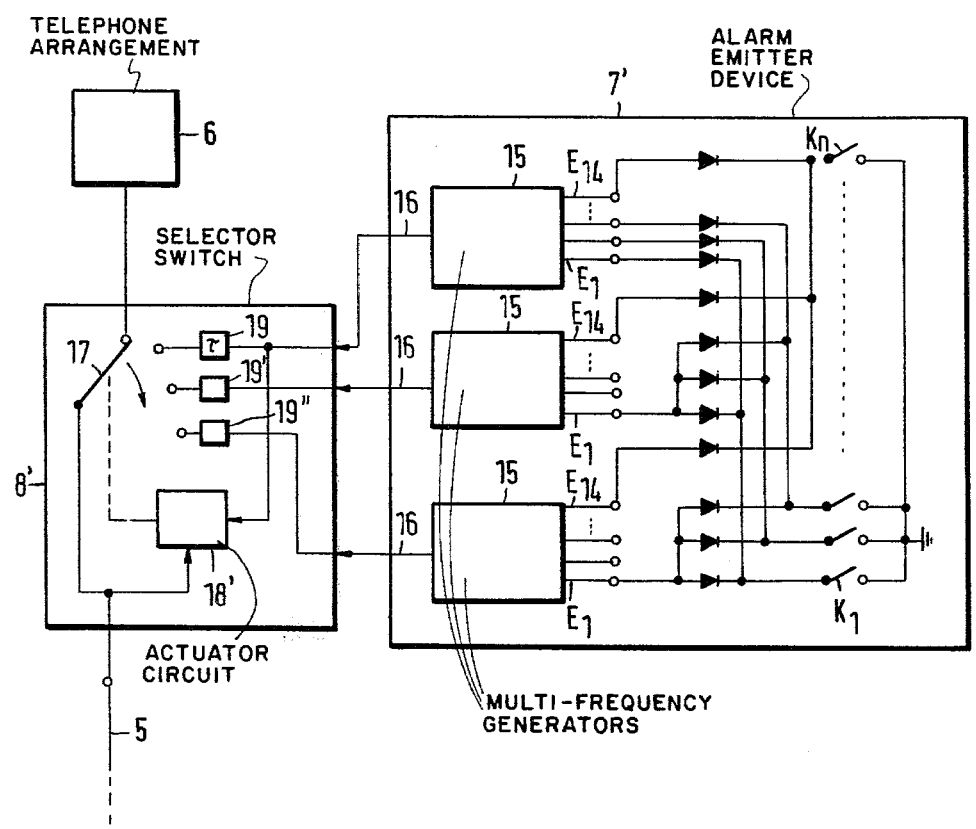
Figure 3:
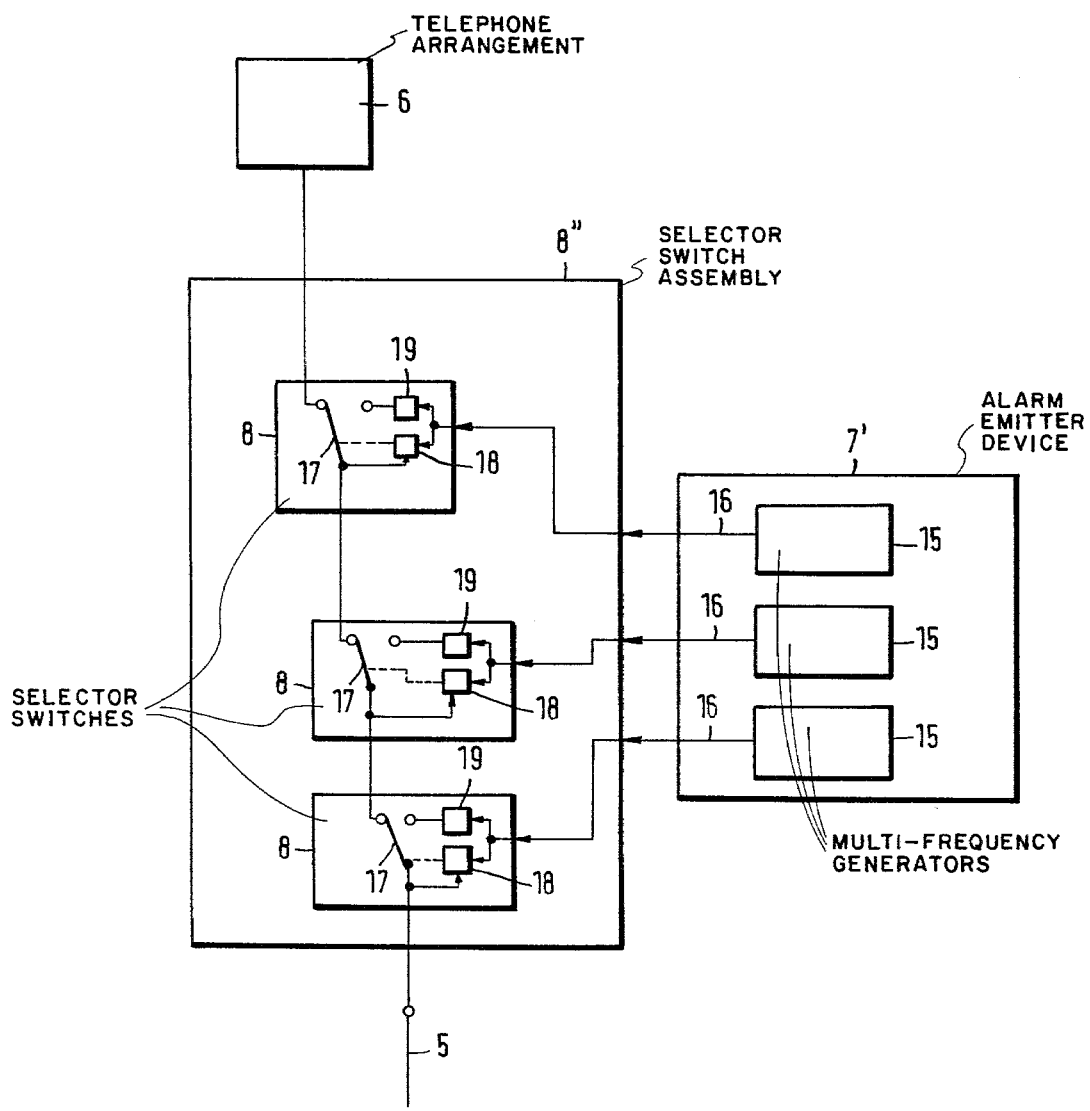

Embodiments of the invention will now be described, by way of example, with reference to the accompanying drawings, in which:

FIG. 1 is a block schematic diagram of a telephone network with an integrated alarm installation; and FIGS. 2 and 3 show modifications of part of the alarm installation of FIG. 1.

In FIG. 1 a block 3 represents a control room of a bank system at a main bank, whilst blocks 4 represent local branch offices, of which there may be more than two. Each branch office 4 is connected to the control room 3 by a respective telephone line 5.

Each branch office 4 has a telephone arrangement 6, an alarm emitter device 7 and a selector switch 8.

The telephone arrangement 6 includes a number of telephones 9, 10 and 11 having dials and/or selector keyboards, a telephone 12 having a selector keyboard, and an exchange 14 for providing a connection between one of the telephones 9 to 12 and the telephone line 5, or a line 13 which is connected to the public telephone network. In this case the switching may be controllable from the telephone 12. However, the telephone arrangement 6 may include only one telephone.

The alarm emitter device 7 includes a multi-frequency generator 15 having fourteen frequency selection inputs $E_1$ to $E_{14}$. To these inputs are connected alarm emitters in the form of normally open contacts $K_1$ to $K_{14}$, which in the case of appropriate wiring of the inputs with phase-inverter amplifiers may be replaced by normally closed contacts. The contacts may, for example, be foot and/or hand-actuated touch contacts as well as glass breakage sensors, or fire, gas or moisture recorders. Moreover, in each input circuit a number of normally open contacts may be connected in parallel or a number of normally closed contacts in series, in order to increase the number of release or supervisory possibilities.

Upon actuation of an alarm emitter $K_1$ to $K_{14}$ the multi-frequency generator 15 generates an alarm signal at the output 16. This contains a prefix which forms an identification of the multi-frequency generator 15. Following the prefix is an identification of that input of the inputs $E_1$ to $E_{14}$ which has been controlled by the alarm emitter which has been released. This indentification can be in the form of a mixed signal of two different frequencies in a code corresponding with the CCITT recommendation for a telephone selection system according to the multi-frequency method with key selection telephone apparatus. A table of associated frequencies is reproduced below.

| Key | Code character - frequency (Hz) | | Designation |
|---|---|---|---|
| | 1st Group | 2nd Group | |
| 1 | 697 | 1209 | f1 + f5 |
| 2 | 697 | 1336 | f1 + f6 |
| 3 | 697 | 1477 | f1 + f7 |
| 4 | 770 | 1209 | f2 + f5 |
| 5 | 770 | 1336 | f2 + f6 |
| 6 | 770 | 1477 | f2 + f7 |
| 7 | 852 | 1209 | f3 + f5 |
| 8 | 852 | 1336 | f3 + f6 |
| 9 | 852 | 1477 | f3 + f7 |
| 0 | 941 | 1336 | f4 + f6 |
| * | 941 | 1209 | f4 + f5 |
| # | 941 | 1477 | f4 + f7 |
| A | 697 | 1633 | f1 + f8 |
| B | 770 | 1633 | f2 + f8 |
| C | 852 | 1633 | f3 + f8 |
| D | 941 | 1633 | f4 + f8 |

The frequency selection input identification, i.e. the frequency mixture, is then followed by a data end mark.

The multi-frequency generator 15 may also have further outputs $A_1$ to $A_{14}$, each of which is associated with a respective one of the inputs $E_1$ to $E_{14}$, and if an input, for example $E_1$, is actuated can generate, only at the associated output $A_1$, a signal which releases an optical alarm emitter $K_1$. Such optical alarm emitter or an acoustic alarm emitter, such as $K_{14}$, can be operated if the alarm emitters $K_1$ to $K_{14}$ on the input side do not give an optical or acoustic alarm on their own.

The selector switch 8 includes a relay having a contact 17 and an actuator circuit 18. The actuator circuit includes a holding switching circuit, for example a flipflop, which triggers an integration circuit for the actuation of the contact 17, so that after cutting off the arrangement 6 from the local end of the telephone line 5 the contact 17 connects the line 5, only after a delay time of about 800 to 1000 milliseconds, to a delay member 19 which is connected to the output 16 from the multi-frequency generator 15. The delay time of the delay member 19 is chosen to be somewhat longer than the delay time of the actuator circuit 18.

The switching over of the selector switch 8, i.e. of the contact 17, is triggered by an alarm signal at the output 16, and its restoration is triggered by an acknowledgement signal sent back over the telephone line 5 from the control room 3 after the receipt of the alarm signal. The relatively long switchover period, during which the contact 17 cuts off the telephone line 5 from the local arrangement 6 but does not immediately connect it to the output from the delay member 19, ensures that a speech connection possibly existing between the branch office 4 and the control room 3 is interrupted and the exchange equipment in the control room 3 is set again in readiness for receipt of an alarm signal. The acknowledgement signal may simultaneously bring about restoration of the local alarm signal emitter which has been released.

In the control room 3, all of the telephone lines 5 are connected to a selector switch 20 which acts as the telephone exchange. The telephone lines can be connected via the telephone exchange 20 at any time to one of a number of terminations such as telephone apparatus 21 or 22, a data processing installation 23, a magnetic recorder 24 or a reproduction device 25, in dependence upon either the dial tone transmitted over the telephone line or the prefix. A connection to the reproduction device 25 is produced upon receipt of a multi-frequency generator identification.

The reproduction device 25 comprises a translator 26 which translates the information content of an alarm signal, fed to it from a branch office, into corresponding control signals for a cathode ray display unit 27 and/or a printer 28, so that on the screen of the display unit 27, or on the print-out from the printer 28, are reproduced the designation of the branch office 4 sending the alarm signal (multi-frequency generator identification), the kind of alarm signal (the particular multi-frequency generator input which is actuated) and, if the occasion arises, the date and time of day of the alarm.

A storage arrangement included in the translator 26 ensures that, upon receipt of an alarm signal, the acknowledgement signal can be sent back very rapidly after, say, 1 to 2 seconds to the branch office in order to restore the selector switch 8 again for re-enabling transmission of a telephone conversation. However, adequate time remains for reproduction by the display unit 27 and the printer 28. In addition, an acoustic alarm emitter (not shown) may also be released in the control room for actuation by the display unit 27 and printer 28. In case the acknowledgement signal is not received, the multi-frequency generator 15 may be made in such a way that it repeats the alarm signal one or more times, and the selector switch 8 returns automatically into the starting position, after the expiry of a predetermined holding time, in the event that the acknowledgement signal is still absent.

In order to prevent an alarm from being recorded by incorrect selection by a telephone which is operating according to the CCITT code by the multi-frequency method, the prefix starts with a character A to D which does not exist on the keyboard of a key selection telephone.

FIG. 2 illustrates a modification of the part of the alarm installation contained in the branch office 4 for a larger number n of alarm signal emitters $K_1$ to $K_n$. In the present example, three similar multi-frequency generators 15 are used. The alarm signal emitters are connected to the inputs $E_1$ to $E_{14}$ of each multi-frequency generator 15 via a respective decoupling diode, so that with each alarm signal emitter there is associated another combination or group from one input of each of the multi-frequency generators 15. In the case of a number x of multi-frequency generators 15 each having a number y of multi-frequency selection inputs, one obtains a number $n = y^x$ of connectable alarm signal emitters or, in the present case, $n = 14^3 = 2744$ alarm signal emitters. Consequently it is possible, without a large additional outlay, to supervise a much larger number of danger points.

If the CCITT code is used in which certain different characters (keys) to be coded use the same frequency for one of the two frequencies (see the above table), the alarm signals from the multi-frequency generators 15 must be fed to the telephone line 5 one after another in order to ensure clear decoding in the control room 3. For this purpose, the selector switch 8' is made as a rotary selector switch in which the contact 17 is connected to the outputs 16 from the multi-frequency generators 15 in sequence via respective delay members 19, 19' and 19''. After receipt of the acknowledgement signal from the control room 3 the contact 17 is switched back again to the junction point 6. The delay times to the delay members 19 to 19'' amount, in each case, to more than double the delay time of the preceding delay member, in order to ensure that the alarm signals from the multi-frequency generators 15 are transmitted one after another and not simultaneously. The switching-over of at least the first multi-frequency generator 15 in the switching sequence on to the telephone line 5 is effected with the same delay as in the case of the embodiment of FIG. 1. The actuation circuit 18' is made in such a way that upon obtaining an alarm signal from one of the multi-frequency generators it starts stepwise forward switching of the contact 17. For this purpose the circuit may contain a pulse generator which, upon receipt of an alarm signal generates three stepping pulses, the instants of occurrence of which are determined according to the delay times of the delay members 19 to 19''.

The translation of the alarm signals from the three multi-frequency generators 15 in the translator 26 in the control room for the formation of the necessary control signals is controlled in time in conformity with the local transmission.

FIG. 3 shows another modification of the alarm installation for a number of multi-frequency generators 15, the control of which is effected just as in FIG. 2, but for simplification of the figure is not illustrated therein. The selector switch 8'' contains a number of selector switches 8 connected in series, which are made just as in the embodiment of FIG. 1 and are connected in each case to one of the outputs 16 from the multi-frequency generators 15.

If one of the alarm signal emitters (not shown) in the alarm signal emitter device 7' responds, all of the multi-frequency generators 15 generate their corresponding alarm signals at the outputs 16.

After the expiry of the delay time of the delay member 19, therefore, the changeover contacts 17 all adopt, simultaneously, the position opposite to that illustrated. The control room end of the telephone line 5 is consequently connected only to the output 16 of the multi-frequency generator 15 at the bottom in FIG. 3, so that only its alarm signal is transmitted into the control room. As soon as the acknowledgement signal arrives from the control room, the selector switch 8 at the bottom in FIG. 3, or its changeover contact 17, switches back into the position illustrated, so that now only the central multi-frequency generator 15 is connected to the telephone line 5. At the same time, the acknowledgement signal brings about resetting of the generator 15 from which the alarm signal has just been transmitted, whilst the remaining generators 15 repeat their alarm signals. Consequently the alarm signal from the central generator 15 is now transmitted. After receipt of the acknowledgement signal, the central selector switch 8 and the corresponding generator 15 are reset, so that now the alarm signal from the top generator 15 is transmitted until the acknowledgement signal arrives again. Hence, the whole of the transmission of the alarm recording from one alarm signal emitter terminates.

A priority control (not shown) ensures that, in the case of simultaneous response of a number of alarm signal emitters, their alarm recordings are transmitted one after another, for example by cyclic connection of the alarm signal emitters to the multi-frequency generator or generators.

What is claimed is:

1. A remote alarm system, comprising, control station telephone apparatus and a control station alarm signal processing unit, a control station selector switch unit between said telephone apparatus and said alarm signal processing unit, remotely located telephone apparatus and a remotely located alarm signal emitter unit, a remotely located selector switch unit between said remotely located telephone apparatus and said alarm signal emitter unit, a dedicated telephone line between said switch units, said alarm signal emitter unit including a multi-frequency signal generator having a plurality of inputs and at least one output, said generator operating to output a composite output alarm signal which comprises a generator identification portion and a sensed input identification portion which is the source of the output signal, a set of condition sensing units connected respectively to said inputs, said selector switch units including first and second switch means respectively wherein said first switch means is responsive to said composite output alarm signal to switch said alarm signal emitter unit to said telephone line and said second switch means also being responsive to said composite output alarm signal to switch said telephone line to said alarm signal processing unit.

2. A remote alarm system according to claim 1 including at least one further multi-frequency generator with another set of condition sensing units connected to its inputs, said condition sensing units of each of said sets being connected respectively to the inputs of each said multi-frequency generator, said remotely located selector switch unit having multiple poles whereby said multi-frequency generators are connectable to said telephone line in sequence.

3. A remote alarm system according to claim 1 including at least one further multi-frequency generator with another set of condition sensing units connected to its inputs, said condition sensing units of each of said sets being connected respectively to the inputs of each said multi-frequency generator, said remotely located selector switch having at least two 2-pole switching devices connected respectively to said multi-frequency generators and arranged in series.

4. A remote alarm system according to claim 1 wherein said signal processing unit operates to send a return acknowledgement signal back to said remotely located selector switch unit, said remotely located selector switch unit being operable upon receiving said acknowledgement signal to switch said remotely located telephone apparatus to said telephone line.

5. A system according to claim 4 wherein said alarm signal emitter unit is operable to transmit repeated signals until said acknowledgement signal is received.

6. A system according to claim 1 wherein said remotely located selector switch unit includes time delay means for delaying the connecting of said alarm signal emitter unit with said telephone line after said remotely located telephone apparatus is disconnected from said telephone line, and said control station selector switch being operative to disconnect said control station telephone apparatus from said telephone line responsive to an open circuit condition at said remotely located selector switch unit during the time delay period of said time delay means.

* * * * *